3 Sheets—Sheet 1.
C. WARTH.
FIRE ENGINE.
No. 11,450. Patented Aug. 1, 1854.
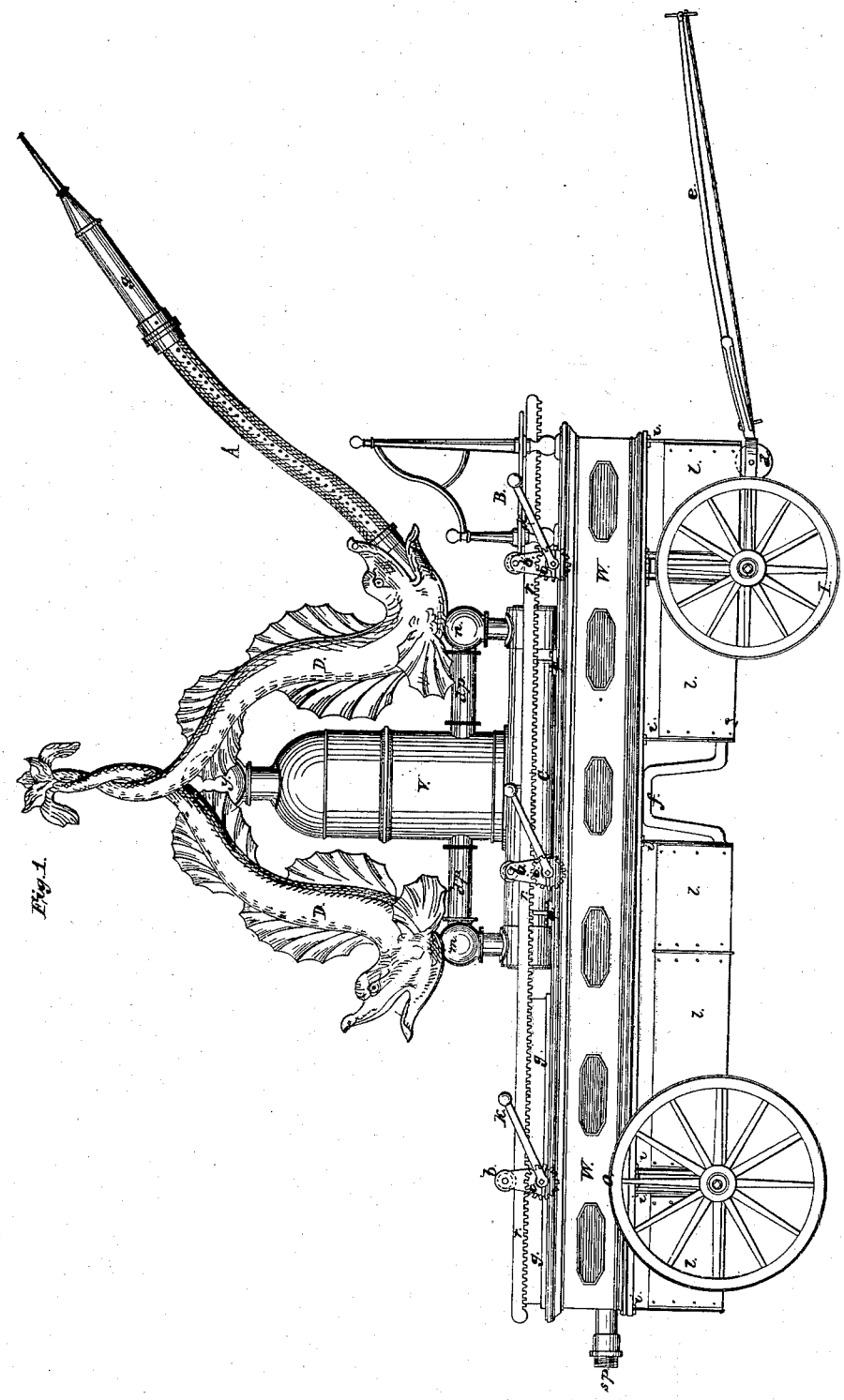

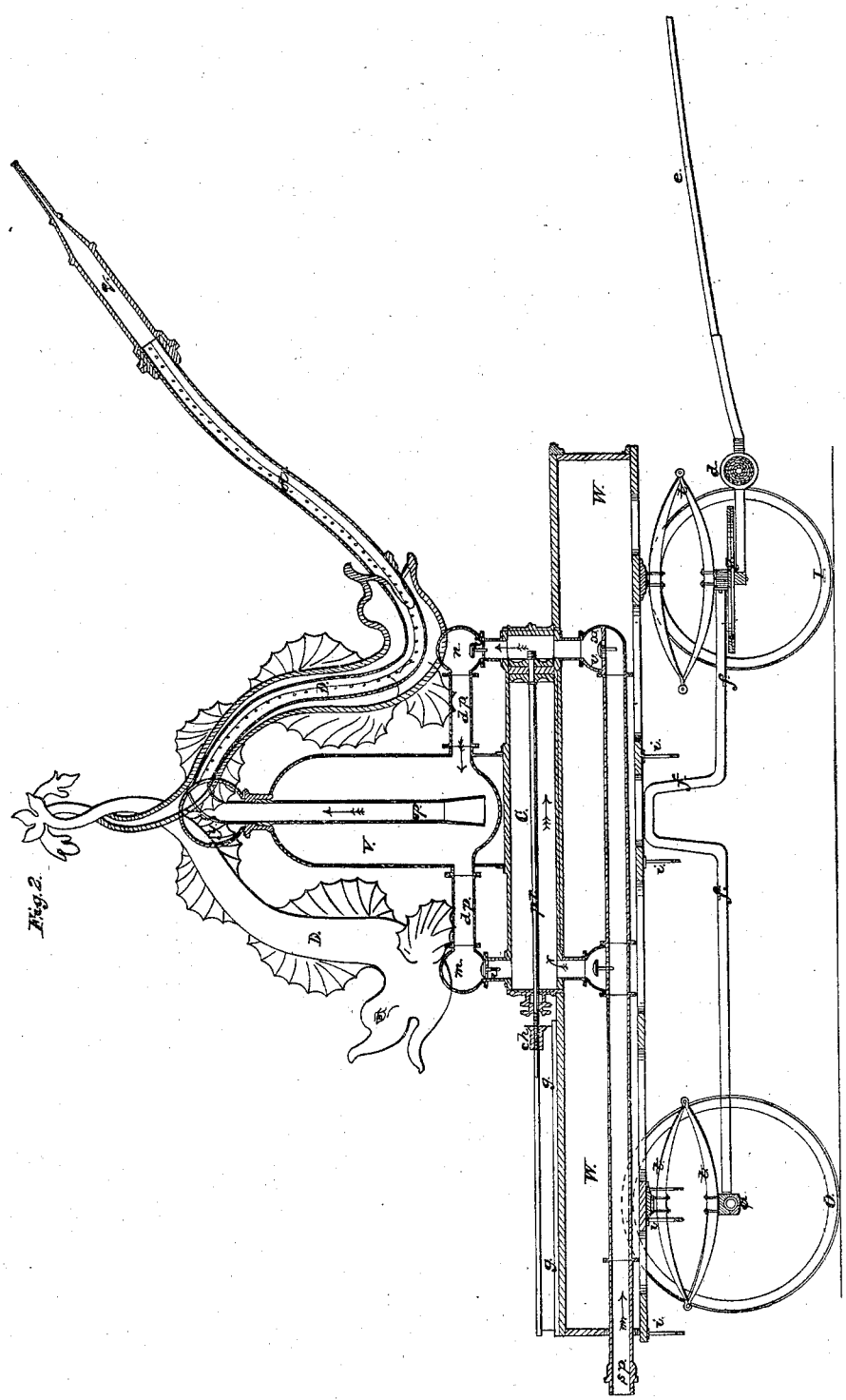

3 Sheets—Sheet 3.
C. WARTH.
FIRE ENGINE.
No. 11,450. Patented Aug. 1, 1854.
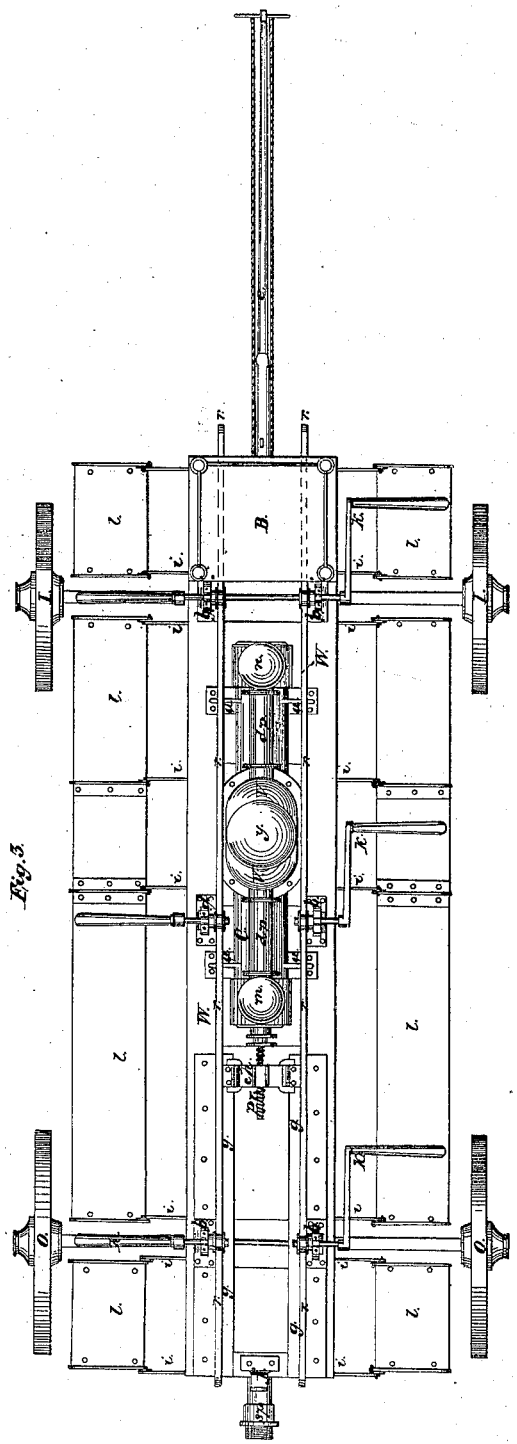

UNITED STATES PATENT OFFICE.

ALBIN WARTH, OF NEW YORK, N. Y.

FIRE-ENGINE.

Specification of Letters Patent No. 11,450, dated August 1, 1854.

*To all whom it may concern:*

Be it known that I, ALBIN WARTH, of the city and county of New York and State of New York, have invented certain Improvements in the Mode of Working Fire-Engines and in the Construction of the Same; and I do hereby declare the following to be a full, clear, and exact description thereof, reference being had to the accompanying drawing, making a part of the same, in which—

Figure 1, is a side elevation. Fig. 2, is a vertical section; and Fig. 3, is a plan, with the ornaments removed.

My invention consists in the mode of working the engine, in which I employ cranks, instead of brakes, and give a very long stroke to the pump, the parts being arranged to conform to this state of things, and connected with the driving parts, so as to allow of the most effective application of manual force to throw the water.

The construction is as follows: Upon a running gear of convenient form and strength; the wagon (W) rests upon springs, attached to this gear; and upon this wagon the pump and moving parts are affixed. The pump is a long cylinder, lying horizontally upon and firmly affixed to the wagon, having openings at each end below and above, for the ingress and egress of the water, with the usual valves of a double action suction and force pump, all of which is clearly shown in Fig. 2—(*f*, *p*,) being the suction pipe; (*u*, *u*,) the ingress valves; and (*v*, *v*,) the egress valves; (*d*, *p*,) the discharge pipes; V, is the common air vessel from which the water passes through the eduction pipe (*e*, *p*,), and leather hose (*s*, *t*); the piston head is solid, and properly packed; and the piston rod (*p*, *r*,) is connected with a cross-head (*c*, *h*,), by elastic springs, of any convenient form, most plainly shown in Fig. 3. Two long straight racks (*v*,) are firmly attached to the cross-head, and run parallel with the piston rod along on each side of the pump: these racks (*r*,) are guided by small rollers (*b b*), placed at proper intervals for that purpose. Into the racks (*r*,), pinions (*o*, *o*), work, by the revolution of which the rack is driven back and forth; the pinions are on crank-shafts running across the top of the wagon, having a crank on each end; the wrist of which (*k*) is long enough to be grasped by two or more workmen, by which it is turned, one standing on each side of the crank opposite to each other. When the piston is driven to one end there is a stop to arrest it, and the motion of the pinion is then reversed, and the piston returned to the opposite end, and so on alternately. To hold the wagon still while the most powerful force is exerted upon the cranks, I have platforms (*l*,) on each side jointed to the wagon, which can be turned down, as shown in Fig. 3; on these the workmen stand, and thus keep the machine steady; by this means also they are raised to a proper height to work the cranks, and are kept out of the wet and mud upon the ground.

The top of my engine I have ornamented with a new design of two dolphins, having their tails entwined over the air vessel; and from the mouth of one the jet is thrown.

Having thus fully described my engine, I desire it to be understood I do not claim the pump or its arrangement of valves, &c., as they are old, although I believe I have employed a much longer stroke than in ordinary engines; but

What I do claim as my invention is—

The arrangement and combination of a horizontal pump with a series of pinions and cranks, as herein described, by means of the long double rack and spring, attached cross-heads and platforms, in the manner and for the purpose set forth.

ALBIN WARTH.

Witnesses:
 JACOB HATSELL,
 THOS. E. WARREN.